US012602466B2

(12) United States Patent
Lichtenau et al.

(10) Patent No.: US 12,602,466 B2
(45) Date of Patent: Apr. 14, 2026

(54) OPERATING A SECURE CODE SEGMENT ON A PROCESSOR CORE OF A PROCESSING UNIT

(71) Applicant: INTERNATIONAL BUSINESS MACHINES CORPORATION, Armonk, NY (US)

(72) Inventors: Cedric Lichtenau, Stuttgart (DE); Jakob Christopher Lang, Walddorfhäslach (DE); Eberhard Pasch, Tuebingen (DE); Christian Borntraeger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 17/457,446

(22) Filed: Dec. 3, 2021

(65) Prior Publication Data

US 2023/0177143 A1     Jun. 8, 2023

(51) Int. Cl.
*G06F 9/50* (2006.01)
*G06F 9/48* (2006.01)
(Continued)

(52) U.S. Cl.
CPC ............ *G06F 21/53* (2013.01); *G06F 9/4812* (2013.01); *G06F 21/74* (2013.01); *G06F 2221/033* (2013.01); *G06F 2221/2143* (2013.01)

(58) Field of Classification Search
CPC .... G06F 21/74; G06F 2221/2143; G06F 9/21; G06F 9/54
See application file for complete search history.

(56) References Cited

U.S. PATENT DOCUMENTS

| | | | |
|---|---|---|---|
| 7,003,676 B1 * | 2/2006 | Weber | ..................... G06F 21/74 |
| | | | 713/172 |
| 7,707,578 B1 | 4/2010 | Zedlewski | |

(Continued)

FOREIGN PATENT DOCUMENTS

| | | |
|---|---|---|
| CN | 109858288 B | 4/2021 |
| CN | 112800431 A | 5/2021 |

(Continued)

OTHER PUBLICATIONS

Author Unknown, "AMD SEV-SNP: Strengthening VM Isolation with Integrity Protection and More," Advanced Micro Devices, Jan. 2020, https://www.amd.com/system/files/TechDocs/SEV-SNP-strengthening-vm-isolation-with-integrity-protection-and-more.pdf, 20 pages.

(Continued)

*Primary Examiner* — Jayanti K Patel
(74) *Attorney, Agent, or Firm* — Elliot J. Shine

(57)     ABSTRACT

A computer-implemented method, a computer system and a computer program product operate a secure code segment on a processor core of a processing unit, wherein the processing unit is configured with at least one processor core. The method comprises requesting exclusive secure execution of a secure code segment of the program code on the at least one processor core. The method also comprises setting the at least one processor core to exclusive secure execution for the secure code segment. The method further comprises executing the secure code segment on the at least one processor core uninterruptably. In addition, the method comprises wiping an architected state and a non-architected state of a physical processor core from the at least one processor core. Lastly, the method comprises setting the at least one processor core to the first execution mode for program code on the at least one processor core.

7 Claims, 2 Drawing Sheets

(51) Int. Cl.
    *G06F 21/53*      (2013.01)
    *G06F 21/74*      (2013.01)

(56)          References Cited

U.S. PATENT DOCUMENTS

| | | | |
|---|---|---|---|
| 8,219,996 B1 | 7/2012 | Morris | |
| 10,068,109 B2 | 9/2018 | Coker | |
| 10,417,048 B2 | 9/2019 | Zedlewski | |
| 11,392,405 B2 | 7/2022 | Liu et al. | |
| 2002/0007456 A1* | 1/2002 | Peinado | H04L 9/0897 |
| | | | 713/164 |
| 2008/0271027 A1 | 10/2008 | Norton | |
| 2009/0031314 A1 | 1/2009 | Moscibroda | |
| 2009/0172369 A1 | 7/2009 | Stillwell, Jr. | |
| 2009/0292931 A1* | 11/2009 | Henry | G06F 21/73 |
| | | | 713/190 |
| 2012/0147937 A1 | 6/2012 | Goss | |
| 2014/0230077 A1 | 8/2014 | Muff | |
| 2015/0324287 A1* | 11/2015 | Priel | G06F 12/0897 |
| | | | 711/118 |
| 2016/0124719 A1 | 5/2016 | Chandaria | |
| 2016/0232005 A1 | 8/2016 | Duale | |
| 2016/0234019 A1 | 8/2016 | Goss | |
| 2016/0259644 A1* | 9/2016 | Brandt | G06F 9/30076 |
| 2017/0140153 A1 | 5/2017 | Zimmer | |
| 2018/0268130 A1 | 9/2018 | Ghosh | |
| 2019/0034357 A1 | 1/2019 | Nunez Mencias | |
| 2019/0102538 A1 | 4/2019 | Gentili et al. | |
| 2021/0173651 A1 | 6/2021 | Mukherjee | |
| 2021/0173657 A1 | 6/2021 | Mukherjee | |
| 2022/0066809 A1 | 3/2022 | Liu et al. | |
| 2023/0176901 A1 | 6/2023 | Lichtenau et al. | |
| 2023/0188679 A1* | 6/2023 | Lim | H04N 7/183 |
| | | | 348/143 |
| 2023/0336799 A1* | 10/2023 | Gopalakrishna Rao | |
| | | | H04N 21/234363 |

FOREIGN PATENT DOCUMENTS

| | | | | |
|---|---|---|---|---|
| DE | 102015213263 A1 | * | 1/2017 | |
| EP | 3462362 A1 | | 4/2019 | |
| EP | 4441600 A1 | | 10/2024 | |
| EP | 4441601 A1 | | 10/2024 | |
| JP | 2010-113585 A | | 5/2010 | |
| JP | 2013-152636 A | | 8/2013 | |
| JP | 2015-014966 A | | 1/2015 | |
| JP | 2019-185092 A | | 10/2019 | |
| JP | 2020-528608 A | | 9/2020 | |
| JP | 2021-089727 A | | 6/2021 | |
| TW | I804388 B | | 6/2023 | |
| WO | 2023/099136 A1 | | 6/2023 | |
| WO | 2023/099137 A1 | | 6/2023 | |

OTHER PUBLICATIONS

Disclosed Anonymously, "Heuristic Real-Time Scheduling in Virtual Machine Monitor," IP.com, IP.com No. IPCOM000222184D, IP.com Publication Date: Sep. 24, 2012, 4 pages.
Townley et al., "SMT-COP: Defeating Side-Channel Attacks on Execution Units in SMT Processors," 2019 28th International Conference on Parallel Architectures and Compilation Techniques (PACT), 2019 IEEE, pp. 43-54.
IBM, List of IBM Patents or Patent Applications Treated as Related, Appendix P, dated Feb. 9, 2023, 2 pages.
Pending U.S. Appl. No. 17/457,449 , filed Dec. 3, 2021, entitled, "Scheduling a Secure Code Segment on a Processor Core of a Processing Unit", 41 pages.
International Searching Authority, "Notification of International Search Report and Written Opinion or Declaration", International Application No. PCT/EP2022/081213, Mailed Feb. 8, 2023, 11 pages.
Notices of References, mailed Mar. 23, 2024, U.S. Appl. No. 17/457,449.
International Searching Authority, "Notification of International Search Report and Written Opinion or Declaration", International Application No. PCT/EP2022/081210, Mailed Feb. 9, 2023, 13 pages.
Schaffer, et al., "The Joy of Scheduling", QNX Software Systems, Jan. 1, 2011, pp. 1-12, XP093019561, Retrieved from the Internet: URL: http://www.qnx.com/content/dam/qnx/whitepapers/2011/qnx_joy_of_scheduling.pdf, [retrieved on Jan. 31, 2023].
Japan Patent Office, "Notice of Reasons for Refusal" Feb. 3, 2026, 08 Pages, JP Application No. 2024-531100.
Japan Patent Office, "Notice of Reasons for Refusal" Feb. 10, 2026, 06 Pages, JP Application No. 2024-531095.

* cited by examiner

210

212

Computer System/Server    228

230

216

RAM

234

Storage System

Processing Unit CPU

Cache    240

218

232

242

Memory

224

222

220

Display

I/O Interfaces

Network Adapter

214

External Devices

OPERATING A SECURE CODE SEGMENT ON A PROCESSOR CORE OF A PROCESSING UNIT

BACKGROUND

The present invention relates in general to data processing systems, in particular, to a computer implemented method, a computer system, a computer program product and a data processing system for operating a secure code segment on a processor core of a processing unit.

Multi-threaded processors may include a plurality of hardware threads that can execute concurrently. One example of a multi-threaded processor may be a simultaneous multithreaded (SMT) processor. In simultaneous multithreading, instructions from more than one thread can be executing in any given instruction pipeline stage at a time. Thus, simultaneous multithreading may allow multiple independent threads of execution to better utilize the resources provided by the processor architecture. Simultaneous multithreading may make each processor of a virtual machine appear as n-processors, called threads, to applications.

Processes or threads from different customers in the cloud or on premise may be virtualized on a virtual machine (VM) or on a container and may run on the same physical core. It is common to request for the thread to run in single-threaded mode.

One implementation of a pipeline for secure multithread execution may be an integrated circuit for executing instructions that includes: a processor pipeline configured to execute instructions from two or more threads in parallel using execution units of the processor pipeline; and a thread hazard circuitry configured to detect that an instruction of a first thread has been designated as a sensitive instruction, and, responsive to detection of the sensitive instruction, block instructions of threads other than the first thread from being executed using execution units of processor pipeline while the sensitive instruction is being executed by an execution unit of the processor pipeline.

In this implementation, just single instructions may be protected verifying that the architectural state of a thread is isolated, whereas the non-architectural state may not be considered.

Permanently reserving a core for all secure work can be done but this may effectively reduce the overall processor performance if not doing the whole-time secure work. Further, it does not scale if a large portion of the work on the computer system requests a secure environment to execute.

SUMMARY

A computer-implemented method is proposed for operating a secure code segment on a processor core of a processing unit, wherein the processing unit is configured with at least one processor core for running a first execution mode for executing program code on the at least one processor core and executing a program code of operating instructions on the at least one processor core. The method at least comprises: (i) requesting exclusive secure execution of a secure code segment of the program code on the at least one processor core; (ii) setting the at least one processor core to exclusive secure execution for the secure code segment; (iii) executing the secure code segment on the at least one processor core uninterruptably; (iv) wiping an architectural state and a non-architectural state of a physical processor core from the at least one processor core; (v) setting the at least one processor core to the first execution mode for executing program code on the at least one processor core.

According to the proposed method, a secure code segment may request an exclusive secure context for at least a minimum time and a minimum count of operating instructions. This comprises, under hardware control, at least securely setting the physical core to an exclusive secure mode, executing without interruption for a minimum time and/or number of operating instructions and finally wiping out at least an architectural and non-architectural state of the physical core from a cache storage or a register or a memory, when finishing the secure code segment or taking any interruption after the initial period of time and/or number of operating instructions.

Advantageously, interferences between different code segments in the processor core may be avoided. A number of failures during execution of the code segments may be reduced. Further, a performance of a computer system may favorably be enhanced by the proposed method of secure operation of a secure code segment in the processor core.

Due to an embodiment of the invention, additionally or alternatively, at least the architectural and non-architectural of the physical processor core may be saved before setting the processor core to an exclusive secure mode. Thus, it is possible to restore, after finishing the execution of the secure code segment, the architectural and non-architectural of the physical processor core in order to continue normal execution of program code.

Due to an embodiment of the invention, additionally or alternatively, at least the architectural and non-architectural state of the physical processor core may be restored before setting the processor core to the first execution mode. Thus, after finishing the execution of the secure code segment, the architectural and non-architectural of the physical processor core may be restored in order to continue normal execution of program code.

Due to an embodiment of the invention, additionally or alternatively, the non-architectural state of the physical processor core may be wiped, in particular from at least one cache storage of the physical processor core, before executing the secure code segment. By this way, no interference with already existing data may occur if the secure code segment is executed.

Due to an embodiment of the invention, additionally or alternatively, wiping the non-architectural state of the physical processor core may be performed in a hardware-controlled manner by hardware of the processing unit. Favorably, the risk of software failures followed by insufficient wiping may be reduced.

Due to an embodiment of the invention, additionally or alternatively, the first execution mode of the processor core may be a simultaneous multithreading mode. Simultaneous multithreading allows multiple independent threads of execution to better utilize the resources provided by the processor architecture and is a normal execution mode of a usual processor core.

Due to an embodiment of the invention, additionally or alternatively, the uninterruptable execution of the secure code segment may be defined for a minimum period of time and/or a minimum number of instructions. Thus, an undisturbed execution of the secure code segment may be guaranteed for efficient processing.

Due to an embodiment of the invention, additionally or alternatively, the uninterruptable execution of the secure code segment may be controlled by a state machine. A state machine may prove as an efficient way of controlling the uninterruptable execution of the secure code segment.

Due to an embodiment of the invention, additionally or alternatively, an interrupt may be blocked during execution of the secure code segment. Favorably, the secure code segment may be executed without disturbance for a minimum amount of time and/or number of operating instructions.

Due to an embodiment of the invention, additionally or alternatively, wiping the architectural and non-architectural state from the at least one processor core after execution of the secure code segment may be initiated by an interrupt request. Thus, further normal execution of program code in the first execution state may be achieved without interference with remaining data from an execution of the secure code segment.

Due to an embodiment of the invention, additionally or alternatively, operating instructions may be implemented on a virtual machine or on a container. Processes/threads running on the same physical core from different customers in the cloud or on premise may favorably be virtualized on a virtual machine or on a container.

Further, a computer system is proposed for operating a secure code segment on a processor core of a processing unit, wherein the processing unit is configured with at least one processor core. The computer system comprises at least one processor unit with at least one processor core, the processor core being configured to running a first execution mode for executing program code on the at least one processor core and executing a program code of operating instructions on the at least one processor core. The computer system is configured to perform a method, at least comprising: (i) requesting exclusive secure execution of a secure code segment of the program code on the at least one processor core; (ii) setting the at least one processor core to exclusive secure execution for the secure code segment; (iii) executing the secure code segment on the at least one processor core uninterruptably; (iv) wiping an architectural state and a non-architectural state of a physical processor core from the at least one processor core; (v) setting the at least one processor core to the first execution mode for executing program code on the at least one processor core.

Running on the proposed computer system, a secure code segment may request an exclusive secure context for at least a minimum time and/or a minimum count of operating instructions. This comprises, under hardware control, at least securely setting the physical core to an exclusive secure mode, executing without interruption for a minimum time and/or number of operating instructions and finally wiping out at least an the architectural and non-architectural state from a cache storage or a register or a memory of the physical core when finishing the secure code segment or taking any interruption after the initial period of time and/or number of operating instructions.

Advantageously, interferences between different code segments in the processor core may be avoided. A number of failures during execution of the code segments may be reduced. Further a performance of a computer system may favorably be enhanced by the proposed method of secure operation of a secure code segment in the processor core.

Due to an embodiment of the invention, additionally or alternatively, the computer system may be configured to save at least the architectural and non-architectural state of the physical processor core before setting the processor core to an exclusive secure mode. Thus, it is possible to restore, after finishing the execution of the secure code segment, the architectural and non-architectural state of the physical processor core in order to continue normal execution of program code.

Due to an embodiment of the invention, additionally or alternatively, the computer system may be configured to restore at least the architectural and non-architectural state of the physical processor core before the processor core is set to the first execution mode. Thus, after finishing the execution of the secure code segment the architectural and non-architectural state of the physical processor core may be restored in order to continue normal execution of program code.

Due to an embodiment of the invention, additionally or alternatively, the computer system may be configured to wipe the non-architectural state of the physical processor core, in particular from at least one cache storage of the physical processor core, before the secure code segment is executed. By this way, no interference with already existing data may occur if the secure code segment is executed.

Due to an embodiment of the invention, additionally or alternatively, the computer system may be configured to wipe the non-architectural state of the physical processor core in a hardware-controlled manner by hardware of the processing unit. Favorably, the risk of software failures followed by insufficient wiping may be reduced.

Due to an embodiment of the invention, additionally or alternatively, the first execution mode of the processor core may be a simultaneous multithreading mode. Simultaneous multithreading allows multiple independent threads of execution to better utilize the resources provided by the processor architecture and is a normal execution mode of a usual processor core.

Due to an embodiment of the invention, additionally or alternatively, the computer system may be configured to execute the secure code segment uninterruptably for a minimum period of time and/or a minimum number of instructions. Thus, an undisturbed execution of the secure code segment may be guaranteed for efficient processing.

Due to an embodiment of the invention, additionally or alternatively, the uninterruptable execution of the secure code segment may be controlled by a state machine. A state machine may prove as an efficient way of controlling the uninterruptable execution of the secure code segment.

Due to an embodiment of the invention, additionally or alternatively, the computer system may be configured to block an interrupt during execution of the secure code segment. Favorably, the secure code segment may be executed without disturbance for a minimum amount of time and/or number of operating instructions.

Due to an embodiment of the invention, additionally or alternatively, wiping the architectural and non-architectural state from the at least one processor core after execution of the secure code segment may be initiated by an interrupt request. Thus, further normal execution of program code in the first execution state may be achieved without interference with remaining data from an execution of the secure code segment.

Due to an embodiment of the invention, additionally or alternatively, operating instructions may be implemented on a virtual machine or on a container. Processes/threads running on the same physical core from different customers in the cloud or on premise may favorably be virtualized on a virtual machine or on a container.

Further, a favorable computer program product is proposed for operating a secure code segment on a processor core of a processing unit, wherein the processing unit is configured with at least one processor core. The computer system comprises at least one processor unit with at least one processor core, the processor core being configured to running a first execution mode for executing program code on the at least one processor core and executing a program code of operating instructions on the at least one processor core.

The computer program product comprises a computer readable storage medium having program instructions embodied therewith, the program instructions executable by the computer system to cause the computer system to perform a method comprising: (i) requesting exclusive secure execution of a secure code segment of the program code on the at least one processor core; (ii) setting the at least one processor core to exclusive secure execution for the secure code segment; (iii) executing the secure code segment on the at least one processor core uninterruptably; (iv) wiping an architectural and non-architectural state of a physical processor core from the at least one processor core; (v) setting the at least one processor core to the first execution mode for executing program code on the at least one processor core.

Further, a data processing system for execution of a data processing program is proposed, comprising computer readable program instructions for performing the method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
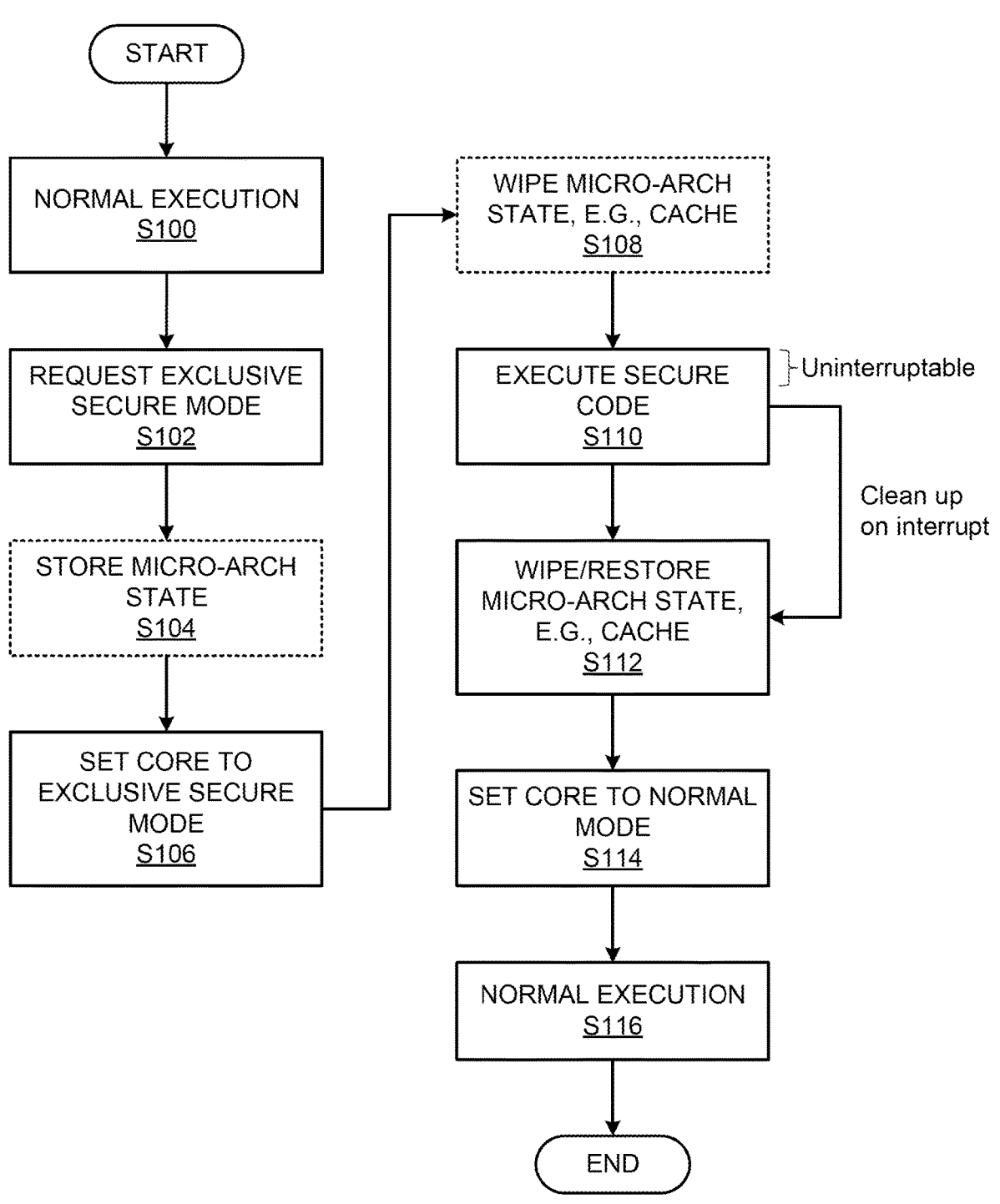
FIG. 1 depicts a flow chart of a computer implemented method for operating a secure code segment on a processor core of a processing unit according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a computer system for operating a secure code segment on a processor core of a processing unit, wherein the processing unit is configured with at least one processor core. The computer system comprises at least one processor unit with at least one processor core, the processor core being configured to running a first execution mode for executing program code on the at least one processor core and executing a program code of operating instructions on the at least one processor core.

The illustrative embodiments may further be used for a method, at least comprising: (i) requesting exclusive secure execution of a secure code segment of the program code on the at least one processor core; (ii) setting the at least one processor core to exclusive secure execution for the secure code segment; (iii) executing the secure code segment on the at least one processor core uninterruptably; (iv) wiping an architectural and non-architectural state from the at least one processor core; (v) setting the at least one processor core to the first execution mode for program code on the at least one processor core.

Figure 2:
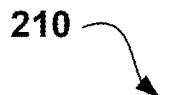
FIG. 2 depicts an example embodiment of a data processing system for executing a method according to the invention.

FIG. 1 depicts a flow chart of a computer implemented method for operating a secure code segment on a processor core of a processing unit 216, as depicted in FIG. 2, according to an embodiment of the invention.

The processing unit 216 is configured with at least one processor core for running a first execution mode for executing program code on the at least one processor core as a normal execution.

The first execution mode of the processor core may be a simultaneous multithreading mode. Simultaneous multithreading allows multiple independent threads of execution to better utilize the resources provided by the processor architecture and is a normal execution mode of a usual processor core.

Operating instructions may be implemented on a virtual machine or on a container. Processes/threads running on the same physical core from different customers in the cloud or on premise may favorably be virtualized on a virtual machine or on a container.

In step S100 a program code of operating instructions is executed on the at least one processor core in the first execution mode.

In step S102 an exclusive secure mode is requested for exclusive secure execution of a secure code segment of the program code on the at least one processor core.

Optionally, in step S104, at least the architectural and non-architectural state of the physical processor core may be saved before setting the processor core to the exclusive secure mode. Thus, it is possible to restore, after finishing the execution of the secure code segment, the architected and non-architected state of the physical processor core in order to continue normal execution of program code.

Next, in step S106, the at least one processor core is set to exclusive secure execution for the secure code segment.

Also optionally, in step S108, the non-architectural state of the physical processor core may be wiped before executing the secure code segment. In particular, the non-architectural state may be wiped from the at least one cache storage or from a register or from a memory of the physical processor core. Wiping the non-architectural state of the physical processor core may be performed in a hardware-controlled manner by hardware of the processing unit 216. Favorably, the risk of software failures followed by insufficient wiping may be reduced. By this way, no interference with already existing data may occur if the secure code segment is executed.

Then, in step S110, the secure code segment is executed on the at least one processor core. The secure code segment is executed uninterruptably for a minimum period of time and/or a minimum number of instructions. The uninterruptable execution of the secure code segment may be controlled by a state machine. A state machine may prove as an efficient way of controlling the uninterruptable execution of the secure code segment.

Any interrupt may be blocked during execution of the secure code segment. Thus, an undisturbed execution of the secure code segment may be guaranteed for efficient processing. Favorably, the secure code segment may be executed without disturbance for a minimum amount of time and/or number of operating instructions.

After finishing the execution of the secure code segment, in step S112, an architectural and non-architectural state may be wiped, in particular from at least one cache storage or from a register or from a memory of the at least one processor core. Wiping the architectural and non-architectural state from the at least one processor core after execution of the secure code segment may be initiated by an interrupt request. Thus, further normal execution of program code in the first execution state may be achieved without interference with remaining data from an execution of the secure code segment.

Optionally, in step S112, at least the architectural and non-architectural state of the physical processor core may be restored before setting the processor core to the first execution mode, if the architectural and non-architectural was saved in step S104. Thus, after finishing the execution of the secure code segment the architectural and non-architectural state of the physical processor core may be restored in order to continue normal execution of program code.

Then, in step S114, the at least one processor core is set to the first execution mode for program code on the at least one processor core, in order to continue normal execution in step S116.

Referring now to FIG. 2, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processing unit 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random-access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further exemplary embodiments of the present disclosure are set out in the following numbered clauses:

Numbered clause 1: A computer implemented method for operating a secure code segment on a processor core of a processing unit (216), wherein the processing unit (216) is configured with at least one processor core for running a first execution mode for executing program code on the at least one processor core and executing a program code of operating instructions on the at least one processor core, the method at least comprising:

(i) requesting exclusive secure execution of a secure code segment of the program code on the at least one processor core;

(ii) setting the at least one processor core to exclusive secure execution for the secure code segment;

(iii) executing the secure code segment on the at least one processor core uninterruptably;

(iv) wiping an architectural state and non-architectural state of a physical processor core from the at least one processor core;

(v) setting the at least one processor core to the first execution mode for executing program code on the at least one processor core.

Numbered clause 2: The method according to numbered clause 1, further saving at least the architectural and non-architectural of the physical processor core before setting the processor core to an exclusive secure mode.

Numbered clause 3: The method according to numbered clause 1 or 2, further restoring at least the architectural and non-architectural state of the physical processor core before setting the processor core to the first execution mode.

Numbered clause 4: The method according to any one of numbered clauses 1 to 3, further wiping the non-architectural state of the physical processor core from at least one cache storage of the physical processor core before executing the secure code segment.

Numbered clause 5: The method according to numbered clause 4, wherein wiping the non-architectural state of the physical processor core is performed in a hardware-controlled manner by hardware of the processing unit (216).

Numbered clause 6: The method according to any one of numbered clauses 1 to 5, wherein the first execution mode for executing program code on the processor core is a simultaneous multithreading mode.

Numbered clause 7: The method according to any one of numbered clauses 1 to 6, wherein executing the secure code segment on the at least one processor core uninterruptably is defined for a minimum period of time and/or a minimum number of instructions.

Numbered clause 8: The method according to any one of numbered clauses 1 to 7, wherein executing the secure code segment on the at least one processor core uninterruptably is controlled by a state machine.

Numbered clause 9: The method according to any one of numbered clauses 1 to 8, wherein an interrupt is blocked during execution of the secure code segment.

Numbered clause 10: The method according to any one of numbered clauses 1 to 9, wherein wiping the architectural and non-architectural state of the physical processor core from the at least one processor core after execution of the secure code segment is initiated by an interrupt request.

Numbered clause 11: The method according to any one of numbered clauses 1 to 10, wherein operating instructions are implemented on a virtual machine or on a container.

Numbered clause 12: A computer system (212) for operating a secure code segment on a processor core of a processing unit (216), wherein the processing unit (216) is configured with at least one processor core, the computer system (212) comprising at least one processor unit (216)

with at least one processor core, the processor core being configured to running a first execution mode for executing program code on the at least one processor core and executing a program code of operating instructions on the at least one processor core, wherein the computer system (212) is configured to perform a method according to any one of numbered clauses 1 to 11, at least comprising:

(i) requesting exclusive secure execution of a secure code segment of the program code on the at least one processor core;

(ii) setting the at least one processor core to exclusive secure execution for the secure code segment;

(iii) executing the secure code segment on the at least one processor core uninterruptably;

(iv) wiping an architectural state and non-architectural state of a physical processor core from the at least one processor core;

(v) setting the at least one processor core to the first execution mode for executing program code on the at least one processor core.

Numbered clause 13: The computer system according to numbered clause 12, being configured to save at least the architectural and non-architectural state of the physical processor core before setting the processor core to an exclusive secure mode.

Numbered clause 14: The computer system according to numbered clause 12 or 13, being configured to restore at least the architectural and non-architectural state of the physical processor core before the processor core is set to the first execution mode.

Numbered clause 15: The computer system according to any one of numbered clauses 12 to 14, being configured to wipe the non-architectural state of the physical processor core from at least one cache storage of the physical processor core before the secure code segment is executed.

Numbered clause 16: The computer system according to any one of numbered clauses 12 to 15, being configured to wipe the non-architectural state of the physical processor core in a hardware-controlled manner by hardware of the processing unit.

Numbered clause 17: The computer system according to any one of numbered clauses 12 to 16, wherein the first execution mode for executing program code on the processor core is a simultaneous multithreading mode.

Numbered clause 18: The computer system according to any one of numbered clauses 12 to 17, being configured to execute the secure code segment on the at least one processor core uninterruptably for a minimum period of time and/or a minimum number of instructions.

Numbered clause 19: The computer system according to any one of numbered clauses 12 to 18, wherein executing the secure code segment on the at least one processor core uninterruptably is controlled by a state machine.

Numbered clause 20: The computer system according to any one of numbered clauses 12 to 19, being configured to block an interrupt during execution of the secure code segment.

Numbered clause 21: The computer system according to any one of numbered clauses 12 to 20, wherein wiping the architected state and the non-architectural state of the physical processor core from the at least one processor core after execution of the secure code segment is initiated by an interrupt request.

Numbered clause 22: The computer system according to any one of numbered clauses 12 to 21, wherein operating instructions are implemented on a virtual machine or on a container.

Numbered clause 23: A computer program product for operating a secure code segment on a processor core of a processing unit (216), wherein the processing unit (216) is configured with at least one processor core for running a first execution mode for executing program code on the at least one processor core and executing a program code of operating instructions on the at least one processor core, the computer program product comprising a computer readable storage medium having program instructions embodied therewith, the program instructions executable by the computer system (212) to cause the computer system (212) to perform a method according to any one of numbered clauses 1 to 11 comprising:

(i) requesting exclusive secure execution of a secure code segment of the program code on the at least one processor core;

(ii) setting the at least one processor core to exclusive secure execution for the secure code segment;

(iii) executing the secure code segment on the at least one processor core uninterruptably;

(iv) wiping an architectural state and non-architectural state of a physical processor core from the at least one processor core;

(v) setting the at least one processor core to the first execution mode for executing program code on the at least one processor core.

Numbered clause 24: A data processing system (210) for execution of a data processing program (240) comprising computer readable program instructions for performing a method according to any one of numbered clauses 1 to 11.

Numbered clause 25: An integrated circuit for executing instructions for operating a secure code segment on a processor core of a processing unit, wherein the processing unit is configured with at least one processor core, the computer system comprising at least one processor unit with at least one processor core, the processor core being configured to running a first execution mode for executing program code on the at least one processor core and executing a program code of operating instructions on the at least one processor core, wherein the integrated circuit is configured to perform a method according to any one of numbered clauses 1 to 11, at least comprising:

(i) requesting exclusive secure execution of a secure code segment of the program code on the at least one processor core;

(ii) setting the at least one processor core to exclusive secure execution for the secure code segment;

(iii) executing the secure code segment on the at least one processor core uninterruptably;

(iv) wiping an architectural state and non-architectural state of a physical processor core from the at least one processor core; and (v) setting the at least one processor core to the first execution mode for executing program code on the at least one processor core.

What is claimed is:

1. A computer-implemented method for operating a secure code segment on a processor core of a processing unit, wherein the processing unit is configured with at least one processor core for running a first execution mode for executing program code on at least one processor core and executing a program code of operating instructions on at least one processor core, the method at least comprising:

requesting exclusive secure execution of a secure code segment of the program code on at least one processor core;

saving at least an architectural state and a non-architectural state of a physical processor core;

setting at least one processor core to exclusive secure execution for the secure code segment;

executing the secure code segment on at least one processor core uninterruptably, wherein executing the secure code segment on at least one processor core uninterruptably is controlled by a state machine and defined for a minimum period of time and a minimum number of instructions, and wherein any interrupt is blocked during the execution of the secure code segment for undisturbed execution for the minimum period of time and the minimum number of instructions;

wiping the non-architectural state of the physical processor core from at least one cache storage of the physical processor core, wherein the wiping of the non-architectural state of the physical processor core before execution of the secure code segment is performed in a hardware-controlled manner by hardware of the processing unit;

restoring at least the architectural state and the non-architectural state of the physical core before setting the processor core to the first execution mode based on the architectural state and the non-architectural state previously saved; and setting at least one processor core to the first execution mode for executing program code on at least one processor core, wherein the first execution mode for executing program code on the processor core is a simultaneous multithreading mode.

2. The computer-implemented method of claim 1, wherein an interrupt is blocked during execution of the secure code segment.

3. The computer-implemented method of claim 1, wherein operating instructions are implemented on a virtual machine or on a container.

4. A computer system for operating a secure code segment on a processor core of a processing unit, wherein the processing unit is configured with at least one processor core, the computer system comprising at least one processor unit with at least one processor core, the processor core being configured to running a first execution mode for executing program code on at least one processor core and executing a program code of operating instructions on at least one processor core, wherein the computer system is configured to perform a method, at least comprising:

requesting exclusive secure execution of a secure code segment of the program code on at least one processor core;

saving at least an architectural state and a non-architectural state of a physical processor core;

setting at least one processor core to exclusive secure execution for the secure code segment;

executing the secure code segment on at least one processor core uninterruptably, wherein executing the secure code segment on at least one processor core uninterruptably is controlled by a state machine and defined for a minimum period of time and a minimum number of instructions, and wherein any interrupt is blocked during the execution of the secure code segment for undisturbed execution for the minimum period of time and the minimum number of instructions;

wiping the non-architectural state of the physical processor core from at least one cache storage of the physical processor core, wherein the wiping of the non-architectural state of the physical processor core before execution of the secure code segment is performed in a hardware-controlled manner by hardware of the processing unit;

restoring at least the architectural state and the non-architectural state of the physical core before setting the processor core to the first execution mode based on the architectural state and the non-architectural state previously saved; and setting at least one processor core to the first execution mode for executing program code on at least one processor core, wherein the first execution mode for executing program code on the processor core is a simultaneous multithreading mode.

5. The computer system of claim 4, being configured to block an interrupt during execution of the secure code segment.

6. The computer system of claim 4, wherein operating instructions are implemented on a virtual machine or on a container.

7. A computer program product for operating a secure code segment on a processor core of a processing unit, wherein the processing unit is configured with at least one processor core for running a first execution mode for executing program code on at least one processor core and executing a program code of operating instructions on at least one processor core, the computer program product comprising a computer readable storage medium having program instructions embodied therewith, the program instructions executable by a computer system to cause the computer system to perform a method comprising:

requesting exclusive secure execution of a secure code segment of the program code on at least one processor core;

saving at least an architectural state and a non-architectural state of a physical processor core;

setting at least one processor core to exclusive secure execution for the secure code segment;

executing the secure code segment on at least one processor core uninterruptably, wherein executing the secure code segment on at least one processor core uninterruptably is controlled by a state machine and defined for a minimum period of time and a minimum number of instructions, and wherein any interrupt is blocked during the execution of the secure code segment for undisturbed execution for the minimum period of time and the minimum number of instructions;

wiping the non-architectural state of the physical processor core from at least one cache storage of the physical processor core, wherein the wiping of the non-architectural state of the physical processor core before execution of the secure code segment is performed in a hardware-controlled manner by hardware of the processing unit;

restoring at least the architectural state and the non-architectural state of the physical core before setting the processor core to the first execution mode based on the architectural state and the non-architectural state previously saved; and setting at least one processor core to the first execution mode for executing program code on at least one processor core, wherein the first execution mode for executing program code on the processor core is a simultaneous multithreading mode.

* * * * *